US006846173B2

United States Patent
Hsu

(10) Patent No.: US 6,846,173 B2
(45) Date of Patent: Jan. 25, 2005

(54) BENDING MACHINE FOR PRODUCTION OF FOAMED DECORATION ARTICLES FOR DOORS AND WINDOWS

(75) Inventor: Pey-Son Hsu, Changhua Hsien (TW)

(73) Assignee: Ching Feng Blinds Ind. Co., Ltd., Changhua Hsien (TW)

( * ) Notice: Subject to any disclaimer, the term of this patent is extended or adjusted under 35 U.S.C. 154(b) by 197 days.

(21) Appl. No.: 10/342,294

(22) Filed: Jan. 15, 2003

(65) Prior Publication Data

US 2004/0137102 A1 Jul. 15, 2004

(51) Int. Cl.[7] .............................................. B29C 53/02
(52) U.S. Cl. ..................................... 425/374; 425/392
(58) Field of Search ................................ 425/363, 374, 425/392

(56) References Cited

U.S. PATENT DOCUMENTS 6,210,140 B1 * 4/2001 Degiorgio et al. .......... 425/392
6,309,588 B1 * 10/2001 Powell et al. ............... 425/392
6,540,500 B2 * 4/2003 Pery-Johnston ............. 425/392

* cited by examiner

*Primary Examiner*—James P. Mackey
(74) *Attorney, Agent, or Firm*—Troxell Law Office PLLC

(57) ABSTRACT

The bending machine adapted for production of foamed decoration articles of doors and windows is provided with a round upper mold and a round lower mold. The former has a central through hole equipped with a retaining member. A hydraulically operated presser is placed above the round upper mold so as to permit the upper mold to move up and down and to spin. The latter has a peripheral flange on a specific section of the upper face and the lower end is equipped with a spinning transmission mechanism to drive the lower mold. At one side and at a distance from the lower mold is disposed a positioning push rod which is engaged with a pneumatically operated device driving the positioning push rod to move back and forth. At the front of the lower mold and the positioning push rod is placed a retaining mount having a housing groove. Besides, the guide groove of the positioning push rod and the housing groove of the retaining mount are parallel and lie flush with the lower mold whereby the foamed decoration articles can be processed in a ready and speedy manner to produce flat and smooth decoration articles.

3 Claims, 6 Drawing Sheets

BENDING MACHINE FOR PRODUCTION OF FOAMED DECORATION ARTICLES FOR DOORS AND WINDOWS

BACKGROUND OF THE INVENTION

The present invention relates to a bending machine for production of foamed decoration articles for doors and windows and particularly to a machine which can produce a standardized arc shaped decoration article with a smooth wrinkleless surface. In operation, a foamed article is simply placed in the placement groove of a retaining mount, then a positioning push rod pushes the foamed article into the lower mold with the foamed article retained in place by a retaining member of the upper mold, at the same time the upper mold and the lower mold spin together to get the foamed article released from the guide groove and bent into a standardized arc shaped decoration article with a smooth wrinkleless surface in a ready, speedy mass production.

Referring to FIG. 1, a conventional foamed article 10 after being injected is softened by boiled water and then is forced to stuff into the arc shaped groove 21 of a mold 20, as shown in FIG. 2, and then the hardened foamed article 10 is taken out of the mold 20 to get an arc shaped decoration plate 11, as shown in FIG. 3.

Such a prior art production process has the following disadvantages:
1. The bending of the foamed article can easily produce rough surface with wrinkles as a result of uneven forces applied thereto.
2. The foamed article 10 must continually be subject to pressure in the mold in the process of bending and be re-shaped at the same time, resulting in the slowing down of the production process.

SUMMARY OF THE INVENTION

Therefore, the primary object of the present invention is to provide a bending machine for producing foamed decoration articles of doors and windows and particularly a machine which can produce standardized wrinkleless smooth arc shaped decoration articles.

Another object of the present invention is to provide a bending machine for producing foamed decoration articles of doors and windows which is equipped with a hydraulically operated device, a rotary transmission mechanism to control the upper and lower mold so as to permit the foamed objects to disengage from the retaining mount and be delivered to the lower mold by way of a positioning push rod one by one; afterwards, the foamed article is fixed in place by a retaining member of the upper mold and rotated along with the lower mold to get the foamed article bent in an easy and speedy manner for mass production.

DETAILED DESCRIPTION OF THE PREFERRED EMBODIMENT

Figure 2:
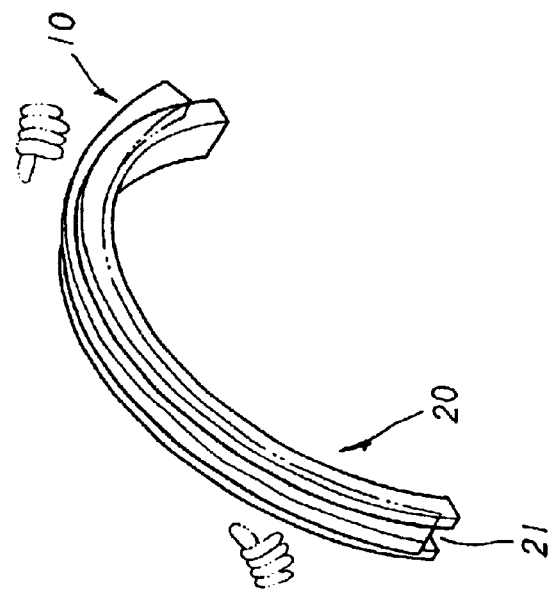
FIG. 2 is a diagram showing the conventional squeezing operation of a foamed object.
Figure 1:
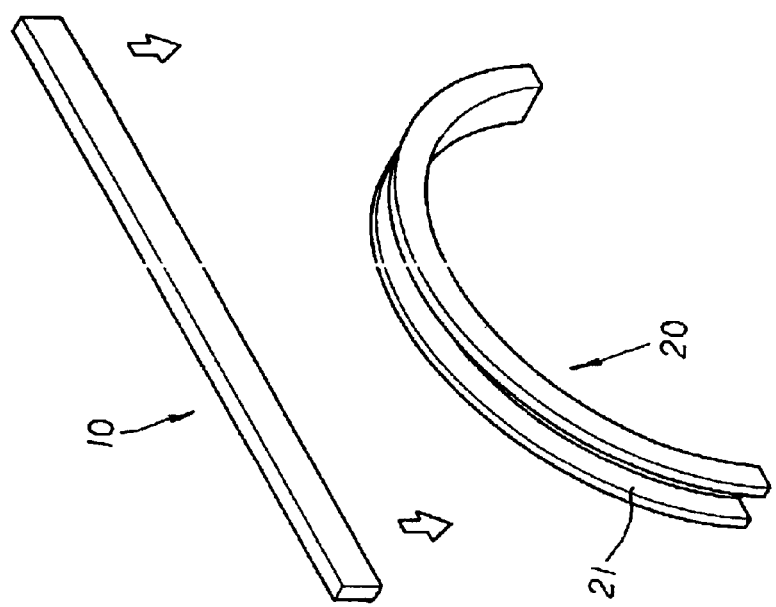
FIG. 1 is a diagram showing the shaping steps in a prior art operation.
Figure 3:
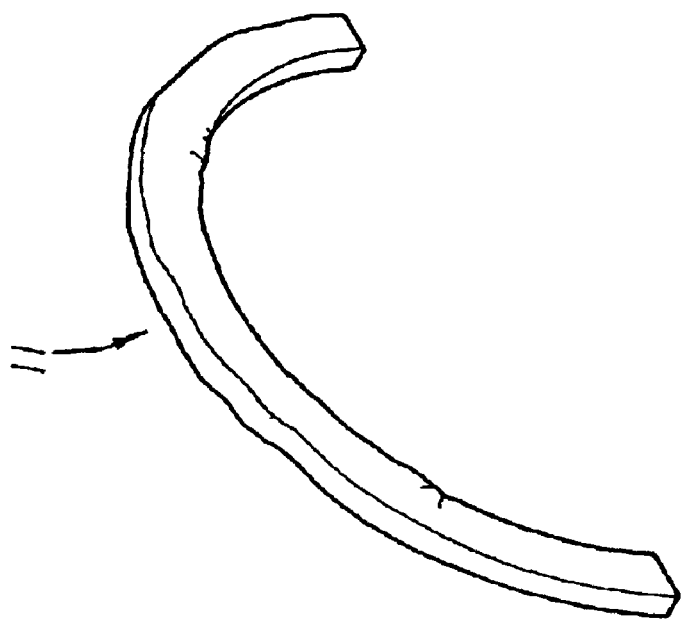
FIG. 3 is a diagram showing a prior art arc-shaped door/window decoration article.
Figure 4:
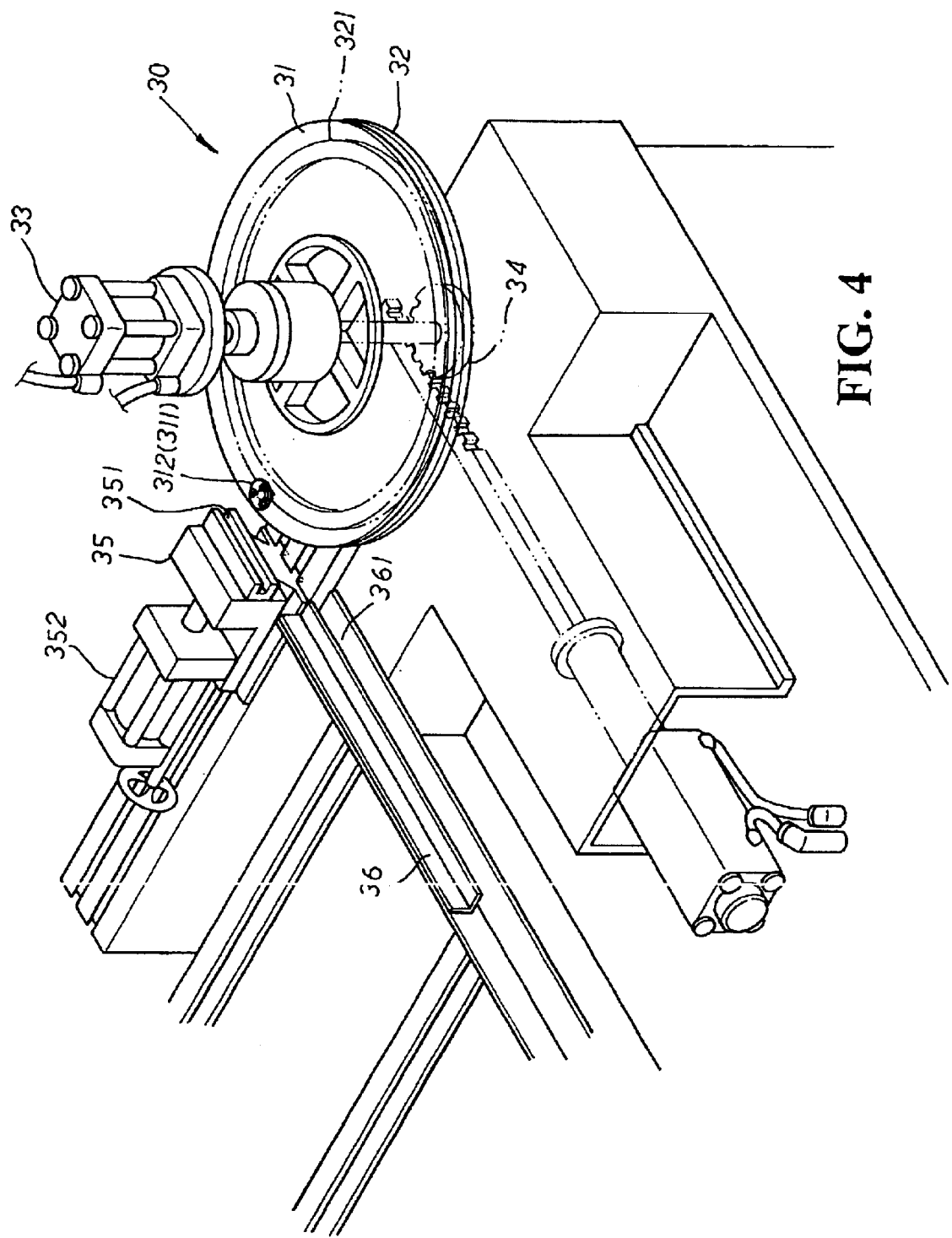
FIG. 4 is a perspective diagram showing the mechanism of the present invention.

Referring to FIG. 4, a perspective diagram showing the embodiment of the present invention, the decoration article bending machine 30 is equipped with a round upper mold 31 and lower mold 32 respectively. The upper mold 31 has a through hole 311 at a proper position which is equipped with a stepped weight member 312 and has a hydraulically operated presser 33 secured at the center, right above the same, so as to permit the upper mold 31 to move up and down and rotate. Near the top surface of the lower mold 32 has a protruded flange 321 on the periphery thereof and below the same is disposed a rotary transmission mechanism 34 to drive the lower mold 32 to spin. A positioning push rod 35 having a guide groove 351 is disposed at a proper distance at one side of the lower mold 32 and is driven to move back and forth from left to right by way of a hydraulically operated device 352 disposed at one side of the positioning push rod 35. Between the lower mold 32 and the positioning push rod 35 and in front of the positioning push rod 35 is placed a retaining mount 36. A placement groove 361 disposed under the retaining mount 36, the guide groove 351 of the positioning push rod 35 and the lower mold 32 lie flush with one another.

Figure 5:
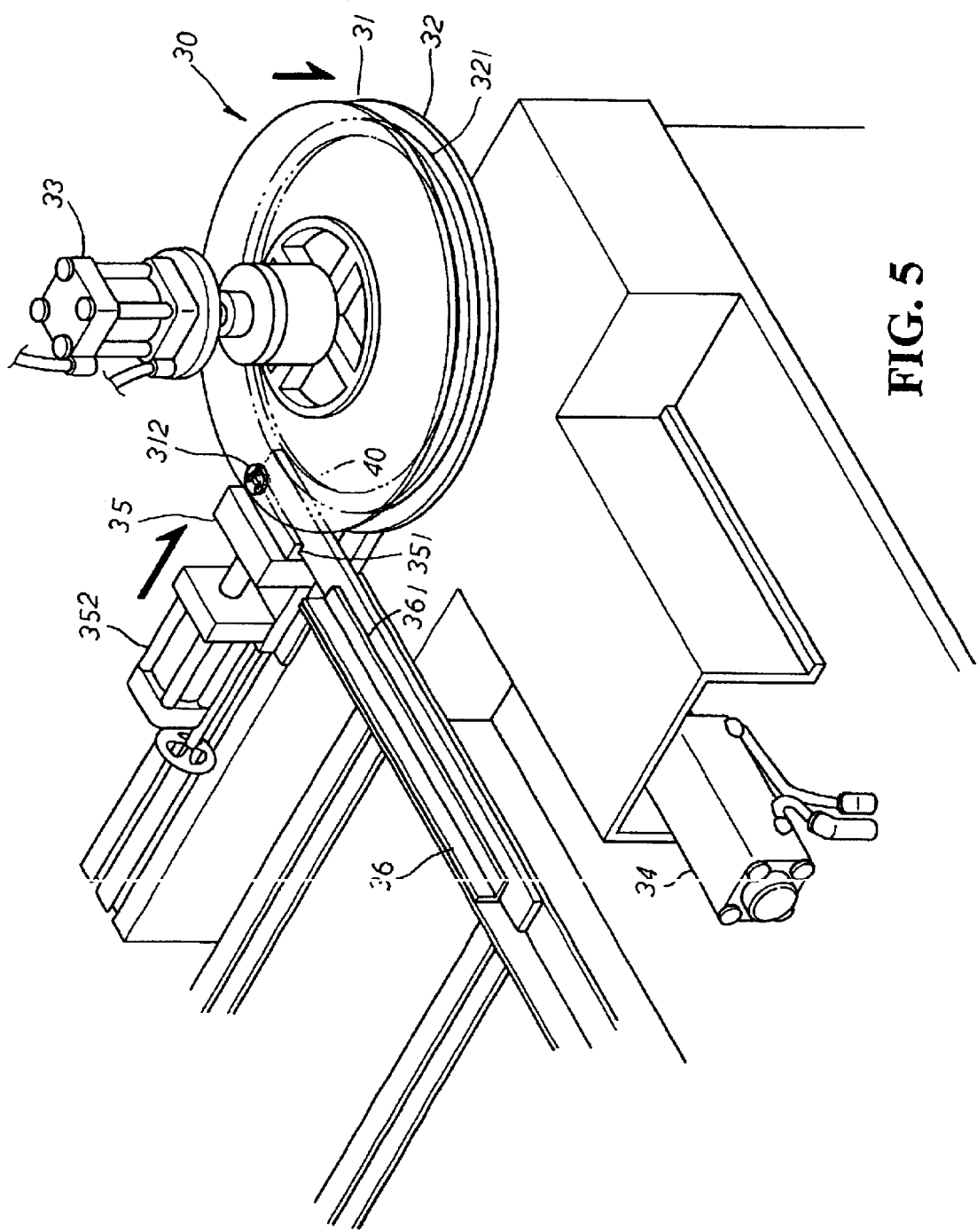
FIG. 5 is a diagram showing the operation mode of the present invention.
Figure 6:
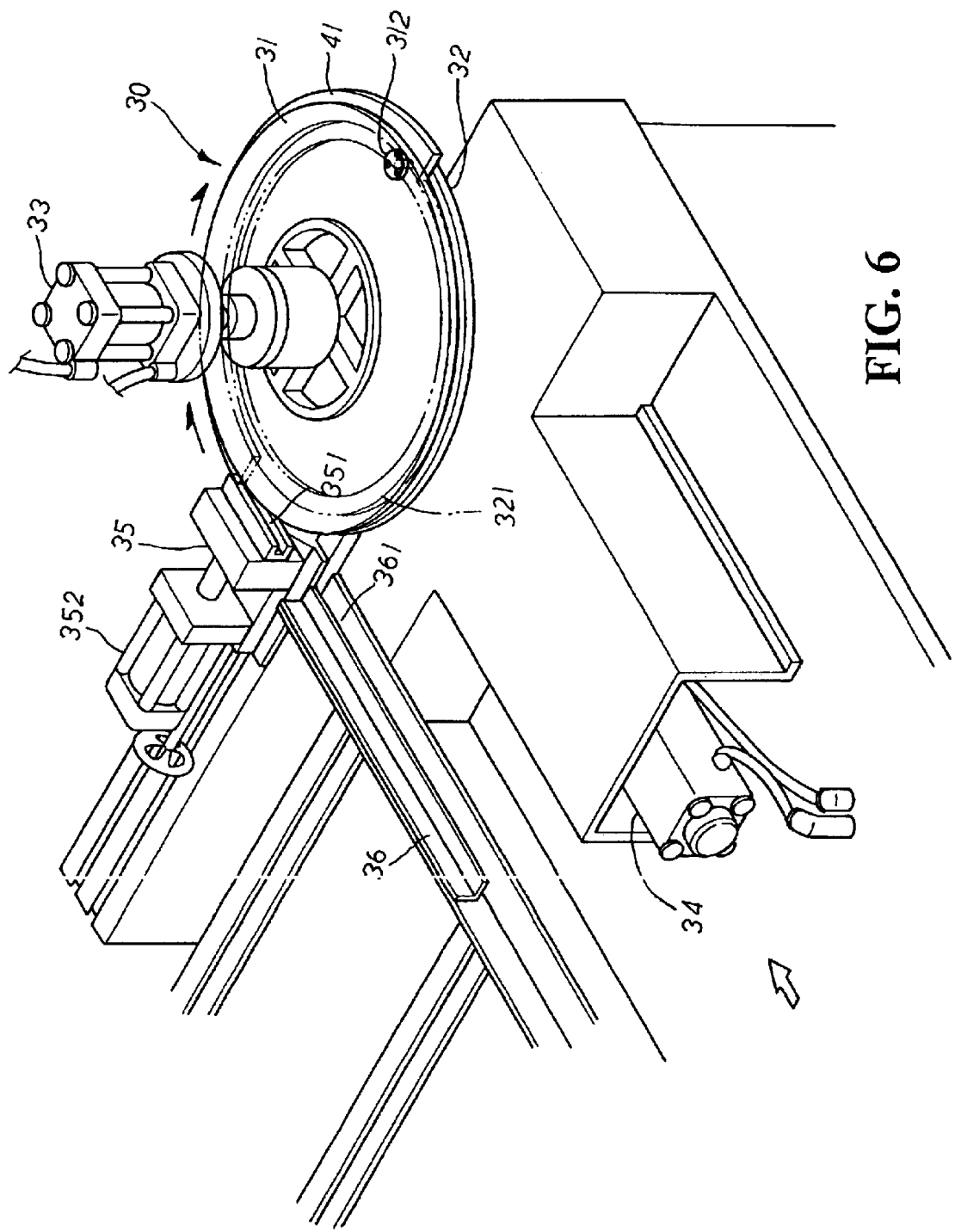
FIG. 6 is a diagram showing the rotation of the upper mold and the lower mold thereof.
Figure 7:
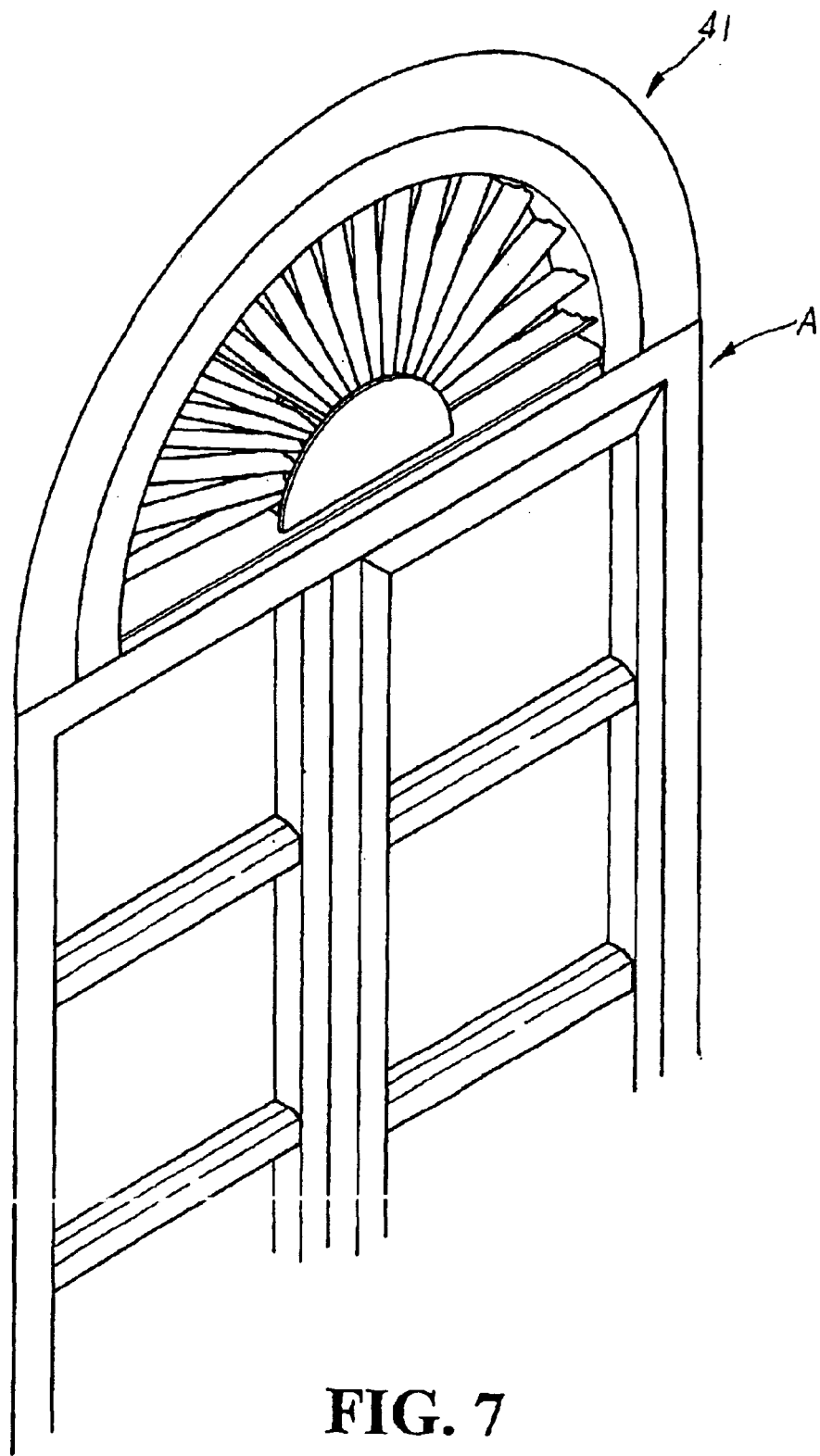
FIG. 7 is a diagram showing the installation of the arc shaped decoration plate onto a window or door.

In operation, as shown in FIG. 5, the foamed article 40 softened in advance is placed in the placement groove 361 of the retaining mount 36 with one end of the foamed article 40 sticking out of the placement groove 361 and at the same level with the guide groove 351. At then, the positioning push rod 35 driven by the hydraulically operated device 352 delivers the foamed article 40 to the above of the lower mold 32 with the guide groove 351 flush with the placement groove 361 and the foamed article 40 pushed into contact with the protruded flange 321 of the lower mold 32, and in the next step the hydraulically operated presser 33 drives the upper mold 32 downwardly to get the foamed article 40 retained in place by the protruded flange 321. Afterwards, the upper mold 32 is driven downwardly by the hydraulically operated presser 33 so as to get the foamed article 40 held in place by the retaining member 312, and then the rotary transmission mechanism 34 drives the upper mold 31 and lower mold 32 to spin simultaneously. As a result, the foamed article 40 limited by the guide groove 351 of the positioning push rod 35 moves along the protruded flange 321 of the lower mold 32 till the foamed article 40 disengages from the placement groove 361 of the retaining mount 36 and comes into shape. Next, the upper mold 31 and the lower mold 32 rotate back into the starting position of the retaining member 312, and then the upper mold 31 is lifted up to take out the hardened foamed article 40 to get an arc-shaped decoration article 41 with smooth and wrinkleless surface. Such a decoration article is secured to a door or window A at a proper position, as shown in FIG. 7.

What is claimed is:

1. A bending machine for production of foamed decoration articles of doors and windows, comprising:
    a circular upper mold and lower mold;
    a hydraulically operated device for driving said upper mold and said lower mold to move up and down and spin;
    a rotary transmission mechanism fixed under said lower mold for driving said lower mold to spin;

a positioning push rod having a guide groove being disposed under and at a distance from said lower mold;

said positioning push rod being engaged with a hydraulically operated device at one end so as to permit the same to move back and forth in operation;

a retaining mount being disposed at a distance from a position between said lower mold and said positioning push rod;

a placement groove being defined under said retaining mount;

said guide groove of said positioning push rod and said placement groove of said retaining mount being parallel and lying flush with said lower mold;

whereby a foamed article placed in said placement groove and said guide groove of said positioning push rod is delivered into said lower mold and retained in place by a retaining member of said upper mold so that said foamed article is bent into an arc shaped by way of said upper mold and said lower mold that are made to spin together.

2. The bending machine as claimed in claim 1 wherein said retaining member of said upper mold is of a stepwise form.

3. The bending machine as claimed in claim 1 wherein said lower mold is provided with a protruded flange at a section of the periphery of an upper surface thereof.

* * * * *